March 29, 1960 J. POS 2,930,124
DENTAL CROWN AND METHOD OF PRODUCING THE SAME
Filed Dec. 19, 1957
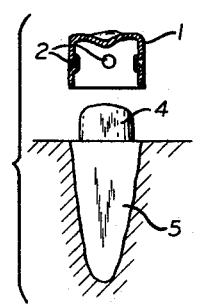
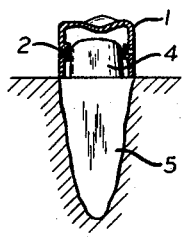
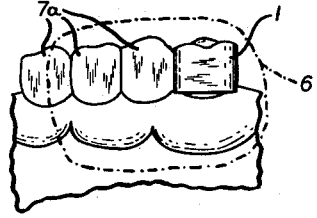
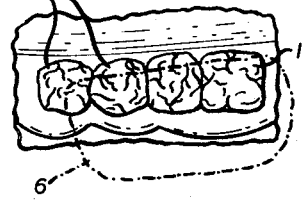
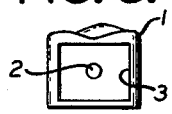
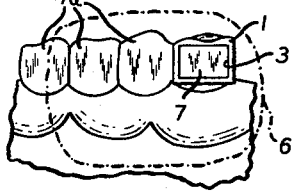
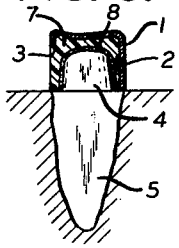
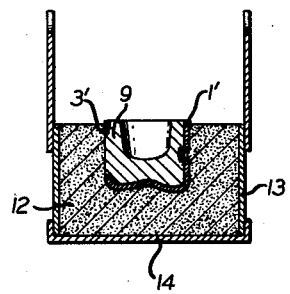
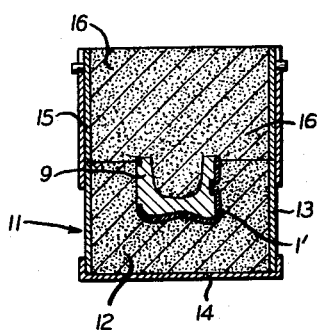
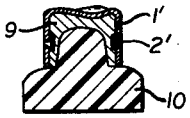
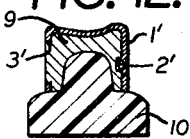
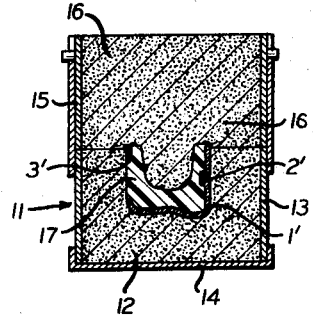
INVENTOR
JULIUS POS
BY
ATTORNEY

United States Patent Office 2,930,124
Patented Mar. 29, 1960

2,930,124

DENTAL CROWN AND METHOD OF PRODUCING THE SAME

Julius Pos, Blauvelt, N.Y., assignor of ten percent to Irving Kayton, New York, N.Y.

Application December 19, 1957, Serial No. 703,867

16 Claims. (Cl. 32—12)

The present invention relates to a dental crown and to a method of producing the same.

It is known in the dental field to produce cast crowns which require a plurality of steps including the taking of an impression as well as of the bite and making a die as well as a model. This known process was uneconomical because it requires comparatively much time of the dentist and the patient.

It is, therefore, one object of the present invention to provide a dental crown which permits of simplification of its production as well as comparatively few steps for mounting such dental crown on a prepared tooth.

It is another object of the present invention to provide a novel method of producing a dental crown as set forth above which reduces the time required from the dentist in preparing and mounting the crown on a prepared tooth.

It is yet another object of the present invention to provide a method of producing a special dental crown which substantially comprises the steps of selecting a shell crown close to the size of the tooth to be covered, placing the fitted crown over the prepared tooth, applying a plaster mold to the crown over the prepared tooth to be worked on together with the adjacent teeth, whereupon the labial surface of the crown is cut out, the latter filled with plastic, the crown mounted on the prepared tooth, applying again the plaster mold over the labial surface of the crown, whereupon the mold and the crown are removed and upon hardening of the plastic previously filled in the crown the latter is cemented on the prepared tooth.

It is also a further object of the present invention to provide still another method of mounting a dental crown on a prepared tooth by selecting again a shell crown close to the size of the prepared tooth, inserting the wax into the crown whereupon the crown is fitted over the prepared tooth to be removed after hardening of the wax, to be filled with die material to obtain a reproduction of the prepared tooth, which die material is removed after hardening thereof. The die forming a reproduction of the prepared tooth is placed again on the crown, whereupon a predetermined portion of the labial surface is cut out therefrom, the labial surface to be filled again with wax which joins the wax already present inside of the crown, and finally the thus prepared crown is inserted into one part of a preferably two-part flask, which has been filled with stone plaster. After the stone plaster is hardened in said one part of the flask the surface of the stone plaster is lubricated and then the second part of the two-part flask is set upon the one part of the flask, thereby, forming a reproduction of the inner face of the crown, and, thereby, of the prepared tooth, subjected to pressure and the stone plaster is hardened. Then the wax is boiled out from the crown and replaced by a plastic therein so that the latter will assume the space taken before by the wax upon rearrangement of the crown. Upon hardening of the plastic, the crown is ready to be cemented on the prepared tooth.

With these and other objects in view which will become apparent in the following detailed description, the present invention will be clearly understood in connection with the accompanying drawings, in which:

Figure 1 is an exploded front elevation, partly in section, of a prepared tooth and a coordinated crown;

Fig. 2 is a front elevation of the prepared tooth with the mounted crown shown partly in section;

Fig. 3 is a front elevation of part of the gum together with the crown mounted on a tooth as well as adjacent teeth and a mold simulated thereover;

Fig. 4 is a top plan view of the showing of Fig. 3;

Fig. 5 is a front elevation of a veneer crown, the labial surface being cut out;

Fig. 6 is a front elevation of a veneer crown similar to the showing of Fig. 5, yet which has a layer of plastic;

Fig. 7 is a front elevation similar to that shown in Fig. 3, however, with the labial surface of the veneer crown being cut out;

Fig. 8 is a front elevation, partly in section, showing the crown cemented to the prepared tooth;

Fig. 9 is a front elevation of a crown mounted on a prepared tooth, the crown being filled with a wax layer;

Fig. 10 is an elevation of a plastic reproduction of the prepared tooth together with the crown mounted thereon;

Fig. 11 is a front elevation of a veneer crown the labial surface being cut out;

Fig. 12 is a sectional elevation of a reproduction of the prepared tooth together with the mounted crown thereon;

Fig. 13 is an axial section through a flask with the dental crown inserted in stone plaster contained in said flask;

Fig. 14 is a sectional elevation through a two-part flask, one part containing the dental crown, the latter being filled with wax; and the other part filled with stone plaster, which penetrates the crown;

Fig. 15 is a sectional elevation of a flask showing substantially the same elements disclosed in Fig. 14, yet having plastic in the crown.

Referring now to the drawings and in particular to Figs. 1, 2, 5 and 6, the dental crown comprises a hollow cylindrical member 1 made of metal, as for instance, silver, gold, aluminum or the like, which has on its inner surface a plurality of but preferably three projections 2 of any suitable shape. The projections 2 may be worked out integrally of the material of the crown or may be secured thereto by welding, soldering or any other suitable means. The projections 2 are adapted to provide improved securing means for the plastic inner layer of the crown, so that upon hardening of the plastic within the crown the projections 2 are embedded therein and a removal of the plastic is practically impossible. As clearly shown in Figs. 5 and 6 the labial surface of the cylindrical member 1 is cut out if a veneer crown is to be provided instead of a full crown to provide a window 3 therein, so that the plastic layer, the application of which will be set forth below, is visible at the front of the cylindrical member 1.

Different methods may be used in order to mount a dental crown on a prepared tooth, which dental crown assumes a perfect position in relation to the gum, as well as in relation to the adjacent teeth and at the same time providing a good bite which is an important aspect in the replacement of a tooth by a crown thereon.

Referring now to Figs. 1 to 8 wherein one embodiment for a method of producing a dental crown on a prepared tooth is disclosed, the first important step to bring about a perfectly fitting crown resides in the selection of a specially prepared shell crown having inner projections 2 and which as to its size and volume is as close as possible to the size of the projecting portion 4 of a prepared tooth 5. In order to determine whether or not the selected shell crown is suitable for a particular tooth to be crowned, it is essential to check the occlusion and check all the contact points with adjacent teeth and finally also the crown must follow the gingival margin. Only after finding that the selected shell crown complies with all mentioned requirements, the crown is finally again placed upon the prepared tooth as clearly shown in Fig. 2 of the drawings.

The prepared tooth is now lubricated and the shell crown receives all around an inside layer of wax and is put over the prepared tooth while the wax is still in its semi-soft state. The bite and all other previously stated requirements for perfect fitting are now repeated. The crown is removed upon hardening of the wax and the wax layer thereof is checked as to its sufficiency.

As a next step, if a veneer crown is to be formed, the crown is put over the prepared tooth again and a plaster mold 6 is formed upon the crown together with the adjacent teeth 7a in order to get an impression of the labial surface of the crown combined with the adjacent teeth 7a. Upon hardening of the plaster the mold 6 and then also the crown are removed. The wax is then boiled and the crown is thoroughly cleaned.

As a next step the labial surface of the crown is cut out to produce a window 3 therein. Then the crown is filled with a plastic layer all around (Fig. 6) which plastic is in a semi-soft state and the crown again mounted on the prepared tooth which has been lubricated again. It is again important to check the proper position of the crown and in particular check again whether the occlusion is correct, as well as all other steps for perfect fitting.

In case of a full crown, the latter, having now a plastic inner layer, is removed and the layer permitted to harden for about thirty minutes. Then the crown is checked, while removed from the tooth, as to the proper thickness of the gingival margin. In order to achieve a perfect fitting around the gingival margin, a part of the metal shell, as well as of the outside face of the plastic layer as required is removed for instance by filing, thereby forming a very thin edge all around the gingival margin without changing the configuration of the inside face of the plastic layer. Finally the full crown is polished and cemented on the prepared tooth.

If, however, a veneer crown is prepared, the engaging surface of the plaster mold 6 receives a separating film and the plaster mold 6 is mounted again over the crown and the adjacent teeth including its labial surface and held firm in such position for five or ten minutes to permit the plastic layer within the crown to form and to harden. By engaging the plaster mold 6 on the plastic projecting through the window 3 of the crown, the plaster mold operates as a die for the front face of the plastic which will assume the same contour as the face of the crown prior to cutting out the window 3. When the plastic has reached its semi-hardened state, the plaster mold 6 and also the crown are removed from the projecting portion 4 of the prepared tooth 5. The plastic layer inside of the crown is now subjected to complete hardening in the crown outside of the mouth and any excess plastic material which has been pushed aside by proper application of the plaster mold 6 is removed by grinding or any other suitable means. The gingival margin is now checked and if necessary a portion removed by grinding or the like as set forth above. Finally the crown is polished including the plastic visible through the window 3 and the crown together with its plastic layer 7 is cemented by means of a cement layer 8 on the projecting portion 4 of the prepared tooth 5.

Referring now to Figs. 8 to 15 which disclose a second embodiment of a method for producing a dental crown, a shell crown comprising a hollow member 1 as disclosed in Figs. 1 to 4, is again selected in the same manner as described in the first embodiment and fitted to the prepared projection 4 of the tooth 5 as well as to the gingival margin, to the occlusion and to the adjacent teeth. The hollow member 1' (Fig. 9) is then removed from the projection 4 and a wax layer 9 is inserted all around into the hollow member 1', the latter having the same as in the first embodiment preferably three inner face projections 2'. The hollow member 1' constituting the crown is then fitted again together with its wax layer in semi-soft state over the prepared projection 4 of the tooth 5 and the occlusion and the gingival margin is checked again. After the wax hardens which requires about two minutes the crown is removed which has now in wax an impression of the projection 4 of the tooth 5. The surface of the wax layer 9 is now lubricated by conventional means and a die material 10 is poured into the crown, such die material being known under the trade name "Diolite," though any other suitable material may be used which leads to a reproduction of the projection 4 of the prepared tooth 5. The die material poured into the hollow member 1', which still contains the wax layer, is then removed. The crown having still its wax layer is mounted again on the reproduction and in case a veneer crown is to be produced the labial surface is cut out from the crown to produce again the window 3'. Then additional wax is applied to the labial surface covering the window 3' which forms the inside wax layer.

A two-part flask 11, as shown in Figs. 14 and 15, is now used in order to provide a plastic layer in the hollow member 1' or the shell crown. This is brought about by pouring stone plaster 12 into one part 13 of the flask 11, the bottom 14 of which is removable and the crown which still has a wax layer 9 therein is inserted into the stone plaster of the flask part 13 in reverse position, that means its open side being free and the crown itself projecting from the upper level of the stone plaster 12. The upper surface of the stone plaster 12 in the flask part 13 will now be lubricated by conventional means. The second flask part 15 is then mounted on the flask part 13 and stone plaster 16 is then poured into the flask part 15 to form a new reproduction of the inside configuration of the crown. When the stone plaster 12 and 16 is in semi-hardened condition both parts 13 and 15 are put into a screw or clamping device in order to press the two parts together as much as possible. The complete hardening of the stone plaster takes about twenty minutes whereupon the screw or clamping device (not shown) is removed. Both parts 13 and 15 are then inserted into boiling water for the purpose of softening the wax 9 still contained in the hollow member 1' which melted wax can now escape. The parts 13 and 15 are again separated and the wax 9 is now removed by boiling the separated flask parts. There is now an empty space created between the new reproduction and the hollow member 1'. A plastic film is now applied to the engaging surfaces of the stone plaster and to said reproduction. A conventional dental plastic material is now inserted into the hollow member 1', in order to give the plastic a glazy and smooth surface. The second part 15 is now put again on the first part 13, so that the new reproduction will shape the inner face of the plastic material or layer 17 pressing the plastic layer 17 over the projections. Both parts are inserted again into a screw or clamping device (not shown) and the plastic is hardened or boiled in water which takes about twenty minutes, depending upon the amount of plastic material used in this process.

The flask is now removed from the screw or clamping device and the part 15 taken off, whereupon the hollow member 1' with the hardened plastic 17 can be removed out of the stone plaster contained in the part 13 of the flask 11. The excess plastic is removed as by grinding and the gingival margin is checked again for perfect fitting, as described before, the shell crown which has a plastic layer therein can now be polished and cemented on the projecting end 4 of the prepared tooth 5 as shown again in Fig. 8.

While I have disclosed several embodiments of the present invention, it is to be understood that these embodi-

I claim:

1. A method of forming a veneer crown on a prepared tooth from metal and a plastic, comprising the steps of cutting out at least a portion of the labial surface of a hollow member, placing within said hollow member a plastic material, forming a portion of said material into a layer and conforming the inner face of said plastic layer to the configuration of said prepared tooth and subjecting the outer face of said plastic layer projecting through said cut-out portion of said hollow member to a confined space, and permanently securing said hollow member together with its plastic layer to said prepared tooth.

2. A method of forming a veneer crown on a prepared tooth from metal and a plastic, comprising the steps of mounting a hollow member on said prepared tooth, forming a mold in front of said hollow member in its mounted position in order to get an impression of said hollow member together with teeth adjacent said prepared tooth, said mold constituting confinement means for said hollow member, cutting out the labial surface of said hollow member, placing within said hollow member a plastic material, forming a portion of said material into a layer and applying said mold in order to confine said plastic layer at the labial surface of said hollow member in the same shape as was the labial surface previously cut out, and permanently securing said hollow member together with its plastic layer to said prepared tooth.

3. A shell crown for mounting on prepared teeth comprising a hollow metallic member having a plurality of metallic projections disposed spaced apart from each other along its inner face, each of said projections being secured to said inner face a distance from the edges of said hollow member.

4. The shell crown, as set forth in claim 3, which includes a plastic layer disposed in and engaging the inner face of said crown.

5. The shell crown, as set forth in claim 4, wherein the labial surface of said crown has a cut-out, so that the outer face of said plastic layer is exposed within said cut-out.

6. A shell crown for mounting on prepared teeth comprising a hollow member having a plurality of projections disposed spaced apart from each other along its inner face, a plastic layer disposed in and engaging the inner face of said crown, said crown having a cut-out in its labial surface, so that the outer face of said plastic layer is exposed within said cut-out, said projections being disposed along said inner face a distance from the edges of said cut-out.

7. A dental crown comprising a hollow metallic portion, a plastic layer disposed within said portions adjacent the inside face of said portion, and means for permanently securing said plastic layer and said metallic portion to each other, said metallic portion having a cut-out in its surface, said securing means being disposed along said inside face of said portion a distance from the edges of said cut-out.

8. A dental crown as set forth in claim 7 wherein said cut-out is disposed in said portion's labial surface.

9. A dental crown comprising a hollow metallic crown element and at least one metallic projection secured to the lingual portion of the inner face of said hollow crown element.

10. A dental crown as set forth in claim 9 wherein the labial surface of said element has a cut-out.

11. A dental crown as set forth in claim 9 including a plastic layer disposed in said crown in engagement with at least a section of said inner face and said projection.

12. A dental crown as set forth in claim 11 wherein the labial surface of said crown has a cut-out, and wherein said cut-out is disposed relative to said plastic layer to render said layer visible through said cut-out.

13. A dental crown comprising a hollow metallic portion, a plastic layer disposed in said crown in engagement with at least a section of the inner face of said hollow metallic portion, and means for permanently securing said layer to said metallic portion comprising at least one physical irregularity in said section of said inner face, said physical irregularity being located in said section of said inner face a distance from the edges of said hollow metallic portion.

14. A dental crown as set forth in claim 13 wherein said dental crown has a cut-out in said metallic portion.

15. A dental crown as set forth in claim 14 wherein said cut-out is disposed in the labial surface of said crown.

16. A method of forming a dental crown on a prepared tooth from metal and plastic, comprising the steps of placing within a hollow metallic member having retention means on the inner face thereof, a plastic material in its soft state, conforming said plastic material to the shape of said prepared tooth, securing said hollow metallic member together with its plastic material to said prepared tooth after said plastic material has hardened, and cutting out at least a portion of the labial surface of said hollow metallic member prior to the placing within said member of said plastic material.

References Cited in the file of this patent

UNITED STATES PATENTS

| | | |
|---|---|---|
| 2,031,996 | Zelesnick | Feb. 25, 1936 |
| 2,537,142 | Lankford et al. | Jan. 9, 1951 |

FOREIGN PATENTS

| | | |
|---|---|---|
| 470,444 | Great Britain | Aug. 16, 1937 |